(12) United States Patent
Goertz et al.

(10) Patent No.: US 8,599,684 B1
(45) Date of Patent: Dec. 3, 2013

(54) CONGESTION ESTIMATION

(75) Inventors: Kevin Goertz, Waterloo (CA); Charles Neville Samuell, Toronto (CA)

(73) Assignee: Avvasi Inc., Waterloo (CA)

( * ) Notice: Subject to any disclaimer, the term of this patent is extended or adjusted under 35 U.S.C. 154(b) by 223 days.

(21) Appl. No.: 13/053,565

(22) Filed: Mar. 22, 2011

Related U.S. Application Data

(60) Provisional application No. 61/407,527, filed on Oct. 28, 2010.

(51) Int. Cl.
*H04L 12/26* (2006.01)
(52) U.S. Cl.
USPC .......................................................... 370/229
(58) Field of Classification Search
None
See application file for complete search history.

(56) References Cited

U.S. PATENT DOCUMENTS

| | | | |
|---|---|---|---|
| 2003/0063611 A1* | 4/2003 | Schaub et al. | 370/395.32 |
| 2005/0164709 A1* | 7/2005 | Balasubramanian et al. | 455/453 |
| 2009/0275343 A1* | 11/2009 | Monnes et al. | 455/453 |
| 2010/0113037 A1* | 5/2010 | Ong et al. | 455/445 |
| 2011/0019551 A1* | 1/2011 | Adams et al. | 370/235 |

* cited by examiner

*Primary Examiner* — Minh-Trang Nguyen

(57) ABSTRACT

An apparatus comprising a plurality of flow model circuits, a categorizer circuit, and a plurality of link model circuits. Each of the flow model circuits may be configured to generate a respective flow measurement signal in response to data packets received from a plurality of links on a network. The categorizer circuit may be configured to present a plurality of link measurement signals, each in response to one or more of the plurality of flow measurement signals. Each of the link model circuits may be configured to generate a respective congestion estimation signal in response to (i) a respective one of a plurality of model parameter signals, (ii) a respective one of the plurality of link measurement signals, and (iii) a respective one of a plurality of score signals. Each of the congestion estimation signals may represent a congestion level of a respective one of the links.

18 Claims, 4 Drawing Sheets

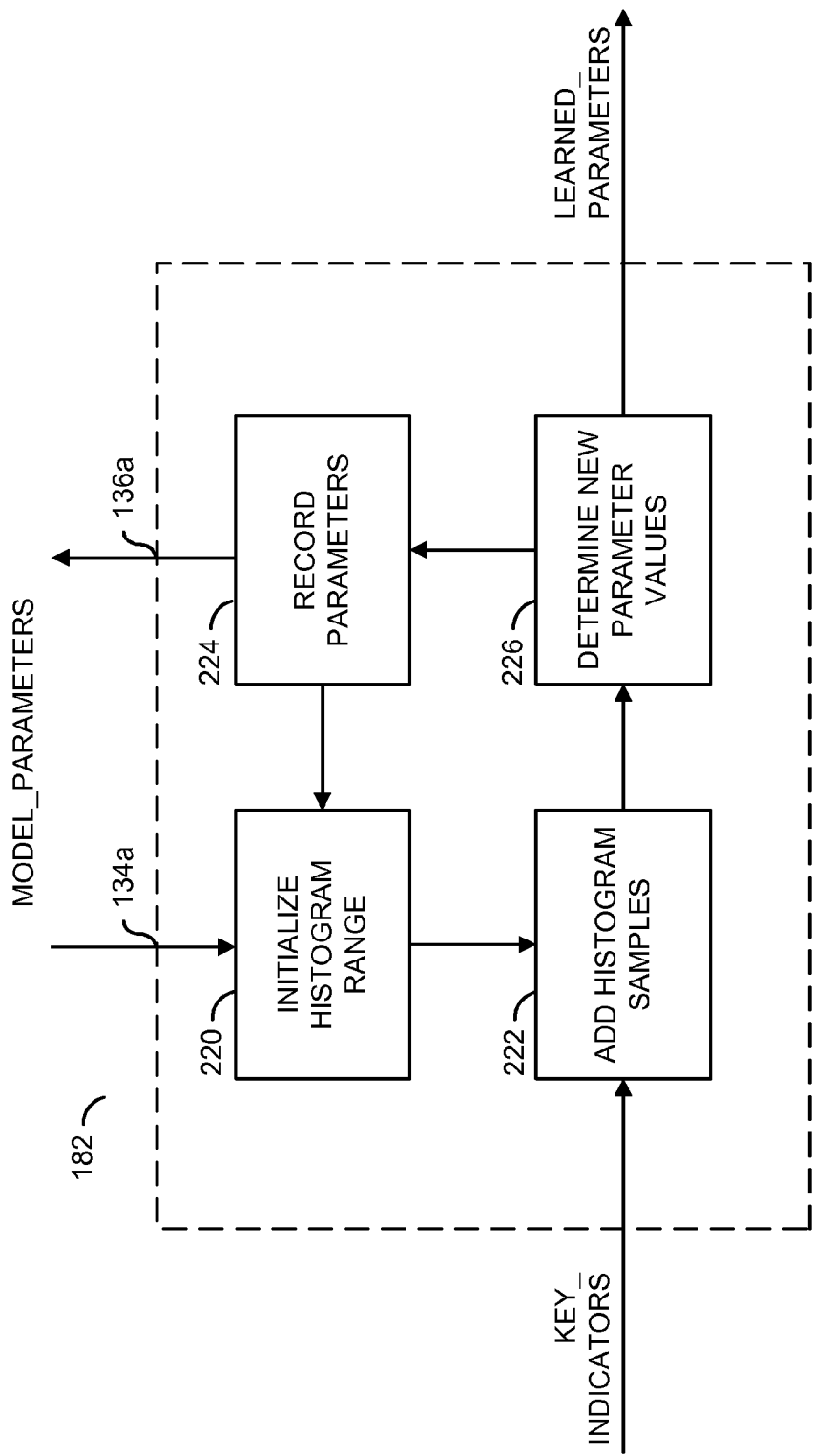

CONGESTION ESTIMATION

This application claims the benefit of U.S. Provisional Application No. 61/407,527, filed Oct. 28, 2010 and is hereby incorporated by reference in its entirety.

FIELD OF THE INVENTION

The present invention relates to communications networks generally and, more particularly, to a system and/or method for providing congestion estimation in a communications network.

BACKGROUND OF THE INVENTION

Conventional cellular networks are a complex system of various network components. Each component handles a specific set of protocols and services multiple clients. Even a moderately sized cellular network will have a large number of towers distributed geographically to provide a radio link between the core network and a number of client devices. Eventually, network traffic from the client devices travels through a small number of links that connect the core network of a provider to the larger Internet.

Due to the growing demands of mobile users, modern cellular networks service an increasingly large amount of bandwidth. Every network component must be sufficiently equipped to support the bandwidth demands. Otherwise, client experience is degraded and network performance suffers.

One aspect of network management is the detection of "congested" links. Congested links occur where the available bandwidth does not meet the actual demand. In a cellular network, making a determination of which links are congested is difficult, since the cost and complexity of installing monitoring systems at each radio tower is prohibitive.

It would be desirable to implement a system to estimate whether or not a particular link is congested where the estimation is accomplished by analyzing aggregate traffic from within the core network.

SUMMARY OF THE INVENTION

The present invention concerns an apparatus comprising a plurality of flow model circuits, a categorizer circuit, and a plurality of link model circuits. Each of the flow model circuits may be configured to generate a flow measurement signal in response to data packets received from a plurality of links on a network. The categorizer circuit may be configured to present a plurality of link measurement signals, each in response to one or more of the plurality of flow measurement signals. Each of the link model circuits may be configured to generate a respective congestion estimation signal in response to (i) a respective one of a plurality of model parameter signals, (ii) a respective one of the plurality of link measurement signals, and (iii) a respective one of a plurality of score signals. Each of the congestion estimation signals may represent a congestion level of a respective one of the links.

According to an aspect of the invention, there is provided an apparatus comprising a plurality of flow model circuits each configured to generate a respective flow measurement signal in response to data packets received from a plurality of links on a network, a categorizer circuit configured to present a plurality of link measurement signals each in response to one or more of said plurality of flow measurement signals, and a plurality of link model circuits each configured to generate a respective congestion estimation signal in response to (i) a respective one of a plurality of model parameter signals, (ii) a respective one of said plurality of link measurement signals and (iii) a respective one of a plurality of score signals, wherein each of said congestion estimation signals represents a congestion level of a respective one of said links.

Preferably, the link model circuits are each configured to extract one or more key indicators from said link measurement signals. The link model circuits can include one or more score gain circuits configured to multiply two or more score values in said respective score signal together. The link model circuits can further include a parameter estimator circuit that causes the apparatus to adapt without user intervention over time, the parameter estimator circuit learning a typical operating range of a particular one of said links to improve an accuracy of congestion estimation.

The apparatus can be implemented within a core of said network, preferably using layer 3 information to perform estimation from a remote location within said core. The apparatus can be implemented as a high performance computer cluster.

The link measurement signals can measure any one or more of an amount of time a data packet takes to travel from one location to another location, a number of data packets lost when being transmitted from one location to another location, and a total number of bytes traveling over a particular one of said links.

According to another aspect of the invention, a method for providing congestion estimation in a communications system, comprises the steps of (A) generating a plurality of flow measurement signals in response to data packets received from a plurality of links on a network, (B) presenting a plurality of link measurement signals each in response to one or more of said plurality of flow measurement signals, and (C) generating a respective congestion estimation signal in response to (i) a respective one of a plurality of model parameter signals, (ii) a respective one of said plurality of link measurement signals and (iii) a respective one of a plurality of score signals, wherein each of said congestion estimation signals represents a congestion level of a respective one of said links.

Preferably, the method further comprises the steps of normalizing each of said respective link measurement signals using said respective model parameter signals to generate said respective score signals, and combining a plurality of score values in said respective score signals to generate said respective congestion estimation signals. Said normalizing can comprise the steps of calculating a first difference by subtracting a lower limit value from an indicator value in said respective link measurement signal, calculating a second difference by subtracting said lower limit value from an upper limit value, and dividing said first difference by said second difference.

The method can further comprise extracting one or more key indicators from said link measurement signals. The method can further comprise the step of initializing one or more ranges in a respective one or more histograms in response to a plurality of model parameters in said model parameter signals, the method further comprising the step of adding said one or more key indicators to a respective one or more histograms.

The method can further comprise the step of updating one or more model parameters in response to said respective one or more histograms, wherein said respective congestion estimation signal is generated in response to said one or more model parameters as updated and is preferably smoothed using hysteresis. A plurality of model parameters conveyed by said model parameter signals can be configured to match an expected behavior of said plurality of links. The method can further comprise the step of adapting said congestion estimation to any of a plurality of hardware configurations, environments and user behaviors.

The network can comprise any of a Universal Mobile Telecommunications Service (UMTS) network, a Long Term Evolution (LTE) network, or a like network.

The objects, features and advantages of the present invention include providing a congestion estimation system that may (i) analyze aggregate traffic from within a core network, (ii) be used to identify problematic links, (iii) be used to schedule network upgrades and/or (iv) be implemented on a device connected to a cellular network.

BRIEF DESCRIPTION OF THE DRAWINGS

These and other objects, features and advantages of the present invention will be apparent from the following detailed description and the appended claims and drawings in which:

FIG. 4 is a block diagram of a parameter estimator.

DETAILED DESCRIPTION OF THE PREFERRED EMBODIMENTS

Figure 1:
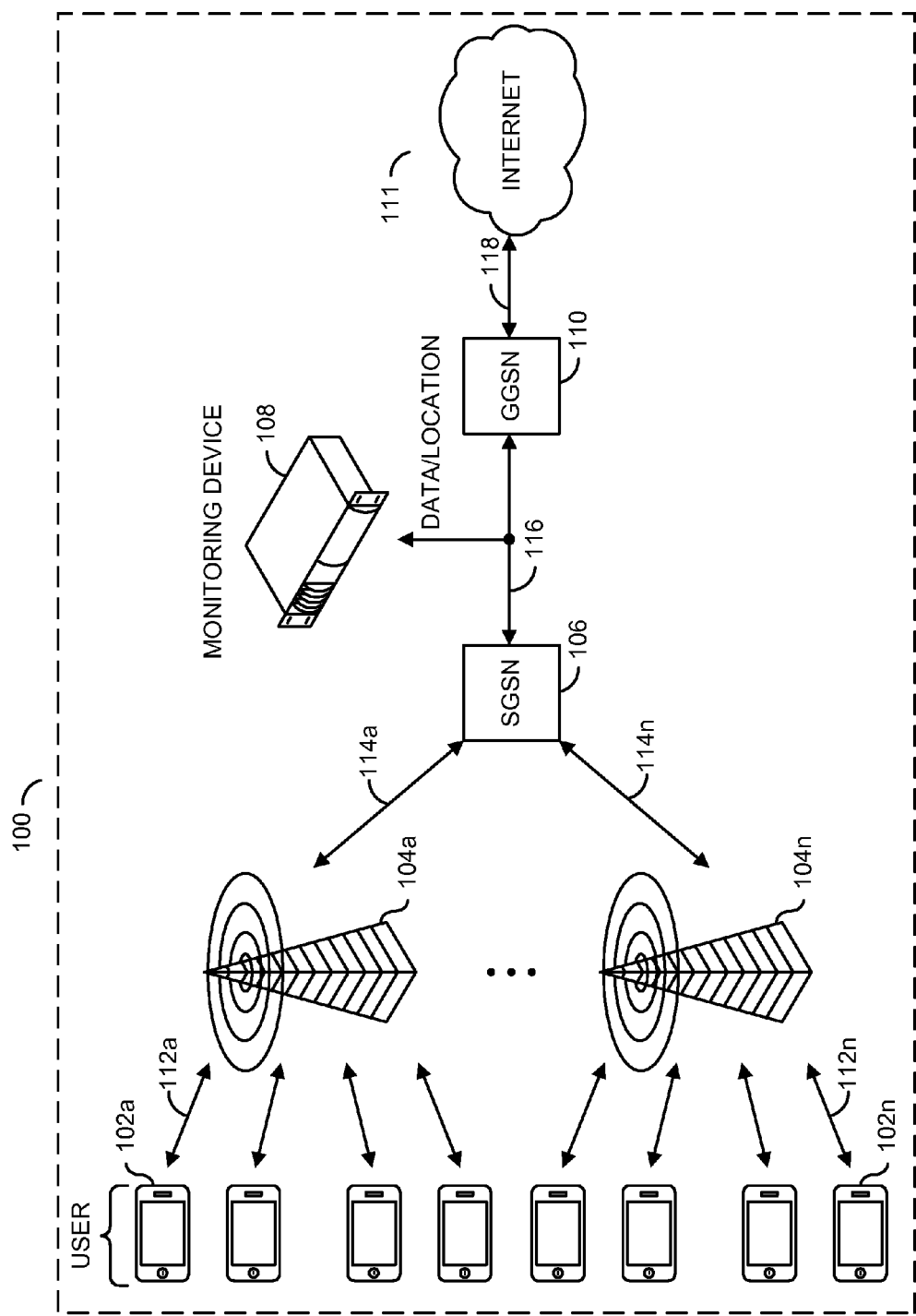
FIG. 1 is a block diagram of a context of the present invention.

The present invention may be configured to operate with inputs from an OSI layer (e.g., layer 2, layer 3, etc.) such that (i) layer 3 information may be used to perform estimation from a remote location within the core network, which may be cheaper and/or easier to implement, (ii) a "categorizer" may allow an operator to estimate congestion on any logical group of flows, which may not necessarily be tied to a physical link, (iii) a highly configurable implementation may adapt to a variety of different hardware, environments and/or user behaviors to be more flexible than a single threshold, since the estimate is calculated from a variety of signals all blended together using the configurable gains, and (iv) parameter estimator allows the system to naturally adapt without user intervention over time, where the system will learn the typical operating range of a particular link and improve its estimation accuracy. Referring to FIG. 1, a block diagram of a system 100 is shown in accordance with a preferred embodiment of the present invention. The system 100 generally comprises a number of devices 102a-102n, a number of devices 104a-104n, a block (or circuit) 106, a block (or circuit) 108, and a block (or circuit) 110. The devices 102a-102n may be implemented as user devices, such as cellular phones, smart phones, Personal Digital Assistants (PDAs), etc. In one example, the devices 104a-104n may be implemented as cellular towers. However, other devices 104a-104n may be implemented to meet the design criteria of a particular implementation. In one example, the system 100 may be implemented in a UMTS wireless network. The circuit 106 may be implemented as a Service Gateway Support Node (SGSN). The circuit 108 may be implemented as a monitoring device. The circuit 110 may be implemented as a Gateway General Support Node (GGSN). The circuit 110 may connect to a network 111 (e.g., the Internet).

Each of the user devices 102a-102n may present one or more data packets through one or more links 112a-112n to one or more of the devices 104a-104n. The data packets from the user devices 102a-102n may be received as flows (or data flows) by one or more of the devices 104a-104n. A flow may be considered a conversation between two computers (or devices) on a network. Such a conversation may be carried out by sending packets back and forth along one or more links (e.g., 112a-112n, 114a-114n, 116, 118, etc.) connecting the two computers. Packets from several flows may travel over the same links. In general, there will be several flows operating on a given link at any point in time. The devices 104a-104n may send the data packets to a core network (e.g., the circuits 106, 108 and 110) of a cell provider using one or more wired links 114a-114n. In general, everything higher than the cell tower level (e.g., the wired components) may be considered the "core network". In a particular network, there may be several more elements in between the tower and the SGSN (e.g., a base station controller, etc.). Packets from one or more cell towers eventually travel to the circuit 106. The data packets may be copied to the monitoring device 108 through a link 116. The link 116 may be implemented as a link that contains an aggregate of the data from the links 114a-114n. The data packets from the aggregate link 116 may then be sent to the Internet 111 through a link 118.

The system 100 may be used by network service providers to identify one or more of the links 114a-114n as a problematic link. A problematic link 114a-114n may be considered problematic due to a heavy volume of data, under-performing (or out of date) hardware, etc. Upgrades, such as adding more of the devices 104a-104n, may be scheduled as necessary in response to determining which of the links 114a-114n is a problematic link. The system 100 may also be used to explain why customers using a particular one of the links 114a-114n may experience poor network performance. Network optimization may be implemented (e.g., via traffic policing, shaping, etc.) in response to performance metrics of the links 114a-114n.

The system 100 may be implemented in IP networks having aggregate traffic that may flow through the aggregate link 116. In general, the system 100 may be implemented in any tree-based IP network (e.g., where there is one large backbone that has several "child" nodes that feed data in, and each of the child nodes has more children feeding more data, etc.). Control data may also be available at the aggregate link 116. For example, in a Universal Mobile Telecommunications Service (UMTS) network, aggregate traffic may be categorized by monitoring the aggregate traffic at the aggregate link 116. The aggregate link 116 may include location information to categorize various data flows received from the devices 102a-102n through the links 114a-114n. Similar deployments may be implemented for other types of cellular networks (e.g., Code Division Multiple Access (CDMA), WiMAX, etc.).

In one example, the system 100 may be implemented as a UMTS cellular network. However, the system 100 may be implemented in other types of networks to meet the design criteria of a particular implementation. In the example shown, the monitoring device 108 may be located on the aggregate link 116 of an IP network. The particular location of the aggregate link 116 may be varied to meet the design criteria of a particular implementation. The monitoring device 108 may observe (a) all the traffic for the links 114a-114n the system 100 is intended to monitor and/or (b) location information for the traffic to be categorized into individual models (to be described in more detail in connection with FIG. 2).

In one example, the monitoring device 108 may be implemented as a computer system installed within the cellular core network used to observe aggregate traffic and/or location info nation. For example, the monitoring device 108 may be implemented as a high performance computing cluster that monitors the Gn link 116 of a UMTS network. The monitoring device 108 may also parse GTP-U packets for traffic information and/or GTP-C packets for location information.

For a UMTS implementation, the network signal DATA and the signal LOCATION are normally both embedded in packets that travel along the aggregate link 116. The GTP protocol may be used to communicate between the SGSN circuit 106 and the GGSN circuit 110 in a UMTS network. In one example, the signal DATA and the signal LOCATION may be obtained by parsing the GTP-U and GTP-C packets.

Figure 2:
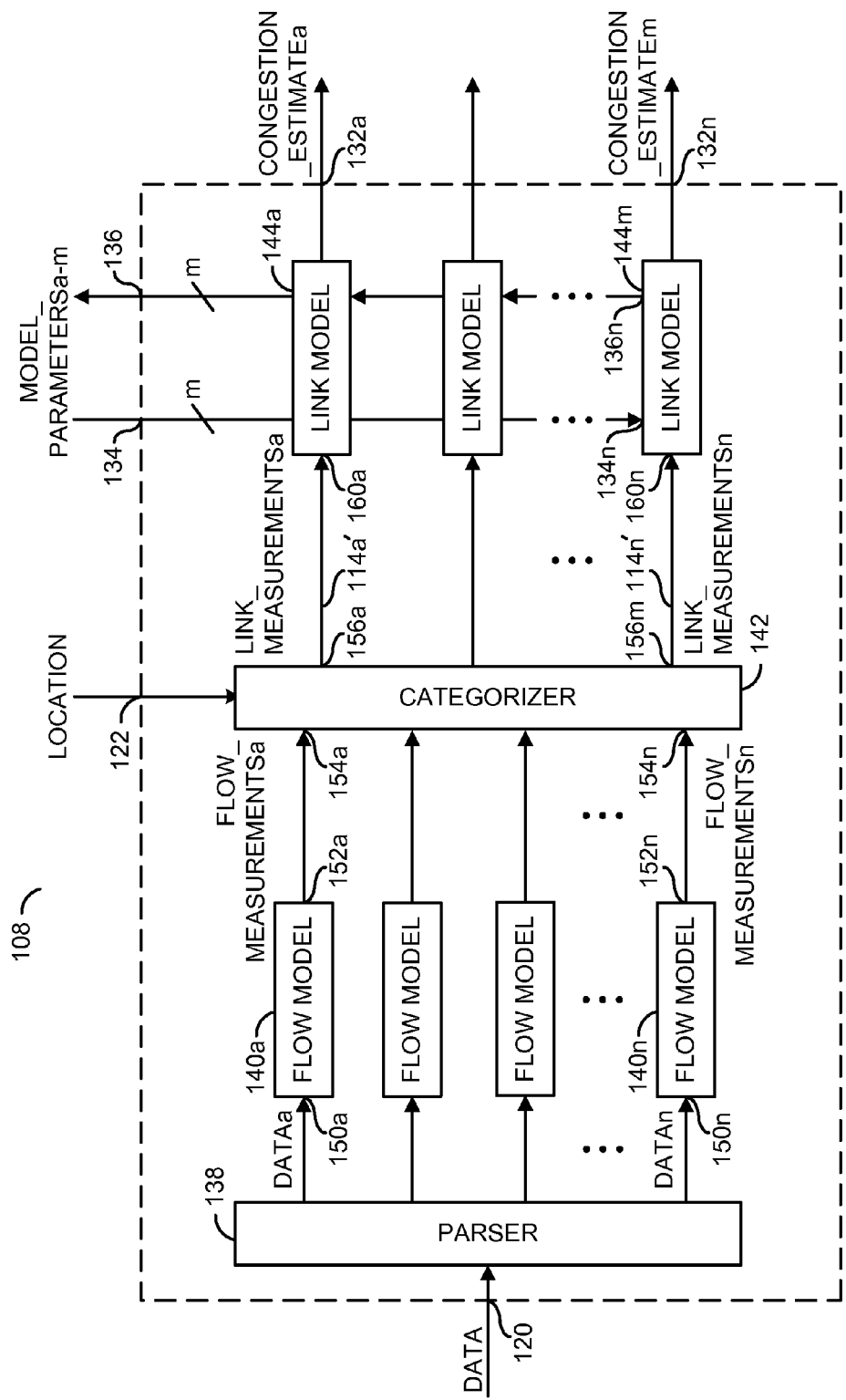
FIG. 2 is a block diagram of a monitoring device.

Referring to FIG. 2, a more detailed description of the monitoring device circuit 108 is shown. The monitoring device 108 may be implemented as software, hardware, or a combination of hardware and software. The circuit 108 may have an input 120 that may receive a signal (e.g., DATA), an input 122 that may receive a signal (e.g., LOCATION), a number of outputs 132a-132n that may present a number of signals (e.g., CONGESTION_ESTIMATEa-m), an input 134 that may receive a signal (e.g., MODEL_PARAMETERSa-m) and an output 136 that may present the signal MODEL_PARAMETERSa-m. The device 108 may (i) divide network traffic into data flows, (ii) derive measurements, (iii) categorize the measurements into links and/or (iv) generate one or more congestion estimates.

The signal MODEL_PARAMETERSa-m may be implemented as a multi-channel signal, where each channel may be used to control one of the link model circuits 144a-144m. In one implementation, each of the bits of the signal MODEL_PARAMETERSa-m may be presented as a separate signal. Each of the link model circuits 144a-144m may receive a different set of configuration parameters. The different configuration parameters may allow a network operator to configure each of the link model circuits 144a-144m differently. For example, each of the devices mentioned (e.g., 104a-104n) may behave differently which may influence the accuracy of the congestion estimation.

The monitoring device 108 generally comprises a block (or circuit) 138, a plurality of blocks (or circuits) 140a-140n, a block (or circuit) 142 and a plurality of blocks (or circuits) 144a-144m. The circuit 138 may be implemented as a parser circuit. The circuit 138 may receive the signal DATA as an input and present a number of signals (e.g., DATAa-DATAn) as outputs. The circuits 140a-140n may be implemented as flow model circuits. The circuit 142 may be implemented as a categorizer circuit. The circuits 144a-144m may be implemented as link model circuits.

The circuit 138 may analyze each packet from the signal DATA, determine which of the flow model circuits 140a-140n the packets correspond to, and move each of the packets to a particular one of the signals DATAa-DATAn. The flow model circuits 140a-140n may mirror the state of the per-device flows (e.g., 112a-112n), but not necessarily the per tower flows (e.g., 114a-114n).

The link model circuits 144a-144m may implement a specific set of indicators, normalized in a configurable way, to derive a state estimate by leveraging correlated behavior (to be described in more detail in connection with FIG. 3). The flow model circuits 140a-140n may mirror the true state of various network flows (e.g., through the links 114a'-114n') for the purpose of generating and/or comparing measurements. The links 114a'-114n' may represent measurements of data from the links 114a-114n. Many flows typically travel over the links 112a-112n. For example, there may be three flow model circuits 140a-140n used to model the traffic traveling from one of the devices 102a-102n over the link 112a. The links 114a', 114b', 114c' may each be measurements of data that was originally sent over the link 112a. In one example, a single one of the user devices 102a-102n may have links to more than one of the devices 104a-104n (e.g., one smartphone may be using the links 112a, 112b, 112c, etc.).

The categorizer circuit 142 may be implemented as a multiple-in, multiple-out (MIMO) device. The categorizer circuit 142 may combine distinct sets of flow measurements into link measurements using location information received from the signal LOCATION. For example, the signal LOCATION may identify which flows belong to each of the links 114a-114n. The link model circuits 144a-144m may mirror the true state of the links 114a-114n for the purposes of generating state (or flow) estimates. In general, the monitoring device 108 may determine congestion estimation for one or more of the links 114a-114n. For a UMTS network, there may be one of the link model circuits 144a-144m implemented for each of the cell tower devices 104a-104n. However, one of the link model circuits 144a-144m may provide congestion information for two or more of the links 114a-114n. Persistent storage of the signal MODEL_PARAMETERSa-m may be implemented for each of the link model circuits 144a-144m.

The signal DATA may be a large stream of packets. The signal DATA may be divided by flow. The flow model circuits 140a-140n may receive the packets, model the conversation and/or generate timed measurements. In one example, the flow model circuits 140a-140n may produce a measurement every second that says, for example, "In the last second, there were 45 packets delivered, 1 packet lost, and the average delivery time was 100 ms", or something similar. Such a measurement may then be categorized based on the flow location and sent to the desired link model circuit 144a-144m. The link model circuits 144a-144m may receive inputs from more than one flow. All of the measurements may be combined into one of the signals LINK_MEASUREMENTSa-n that represents all the flows, for example, "In the last second, across all the flows for this link, there were 110 packets delivered, 2 packets lost, and the average delivery time was 110 ms", or something similar.

The circuits 140a-140n may have respective inputs 150a-150n that may each receive a sub-set of the signal DATA. The circuits 140a-140n may have respective outputs 152a-152n that may each present a signal (e.g., FLOW_MEASUREMENTSa-n). The signal DATA may represent a stream of network packets that are aggregated from all the links 114a-114n. The signal DATA may be parsed and/or separated into the signals DATAa-DATAn which may mirror the individual network links 114a-114n based on TCP/IP information via the parser circuit 138. The signals FLOW_MEASUREMENTSa-n may represent measured packets for a particular data flow (e.g., a data flow through a particular one of the devices 104a-104n).

The circuit 142 may have a number of inputs 154a-154n that may receive a respective one of the signals FLOW_MEASUREMENTSa-n and an output 156 that may present a number of signals (e.g., LINK_MEASUREMENTSa-n). The circuits 144a-144m may have respective inputs 160a-160n that may each receive a particular one of the signals LINK_MEASUREMENTSa-n. The circuits 144a-144m may each present a respective one of the signals CONGESTION_ESTIMATEa-n. For example, the signal CONGESTION_ESTIMATEa may provide information on the congestion level of the link 114a.

The link model circuits 144a-144m may be implemented to model the behavior of one of the network links (e.g., one of the links 114a-114n). The categorizer circuit 142 may measure all of the flows that use a particular one of the links 114a-114n. The categorizer circuit 142 may use the information in the signal LOCATION to inspect the flow measurements and determine which of the links 114a-114n each of the signals FLOW_MEASUREMENTSa-n belongs to. Each of the signals FLOW_MEASUREMENTSa-n may be assigned to one of the link model circuits 144a-144m by adding to the particular signal LINK_MEASUREMENTSa-n. The combiner circuit 142 may combine the signals LINK_MEASUREMENTSa-n into the network links 114a-114n based on location information (e.g., LOCATION).

The monitoring device 108 may receive network traffic and divide the traffic into flows and/or categorize the flows. Each flow may represent an individual download (or another two way communication method) from one of the devices 102a-102n. For example, all of the packets that make up a download from a web page on the Internet 111 may be grouped into a single flow. The monitoring device 108 generally provides the framework for processing packets, distributing data between processing elements, combining measurements from multiple processors and/or running the processes described by the link model circuits 144a-144m. For example, the flow model circuits 140a-140n may implement a process that observes IP traffic to mirror the network flow. The flow model circuits 140a-140n may then use the network flow to measure latency and/or packet loss.

The monitoring device 108 may be particularly useful for wireless networks. Wired and wireless links often behave differently, suggesting different approaches to congestion estimation. The link model circuits 144a-144m may be configured to accurately estimate flow of one (or both) of a wired and/or wireless network. The signals LINK_MEASUREMENTSa-n may be generalized into a variety of scores (to be described in more detail in connection with FIG. 3). The scores may be combined together mathematically to determine a state estimate. The link model circuits 144a-144m may accomplish such a state estimate in a configurable implementation. A wireless link may have latency and/or packet loss that may tend to be higher than a wired link. The estimation process in the link model circuits 144a-144m may be configurable by a large set of parameters that may allow a given one of the link model circuits 144a-144m to be tuned to match the expected behavior of a particular one of the links 114a-114n. In a wireless model example, a higher bound may be set for a latency indicator and/or a lower weight may be set for a packet loss gain term.

The categorizer circuit 142 may track network flows. The categorizer circuit 142 may receive all flow measurements (e.g., FLOW_MEASUREMENTS)a-n. The signals FLOW_MEASUREMENTSa-n may be categorized into links based on location info nation (e.g., received in the signal LOCATION). In one example, all the flows using a single device 104a-104n may be combined into a single set of flow measurements. In one example, the location information may be obtained from a different source than the aggregate traffic. In another example, the location information may be embedded in the signal DATA. Therefore, the categorizer circuit 142 may track which flows do not belong to a known link 114a-114n and/or when a particular flow moves from one link 114a-114n to another.

The link model circuits 144a-144m may each generate a respective one of the signals CONGESTION_ESTIMATIONa-m to determine if a particular one or more of the links 114a-114n in the network 108 is congested. The link model circuits 144a-144m may extract key indicators and/or normalize the key indicators against the signals MODEL_PARAMETERSa-m. The link model circuits 144a-144m may also combine one or more normalized scores into an estimate using proportional, cross-correlation and/or derivative gains. In one example, there may be a number of flow model circuits 140a-140n (e.g., one or more) for each link model circuit 144a-144m. Therefore, the categorizer circuit 142 may receive a number of inputs (e.g., 154a-154n) and generate a different (e.g., either smaller or larger) number of outputs 156a-156m.

In general, the congestion modeling of the system 100 may be considered as being calculated for a device (e.g., one of the devices 104a-104n) or for a link (e.g., one of the links 114a-114n). Some of the modeling may be useful when equating devices to devices (e.g., the link model circuits 144a-144m may model the devices 104a-104n). For example, there may be one link model circuit 144a-144m implemented for each of the devices 104a-104n.

The signals FLOW_MEASUREMENTSa-n may be different signals that may be collected by the categorizer circuit 142 and combined into groups of measurements to form the signals LINK_MEASUREMENTSa-n. The signals FLOW_MEASUREMENTSa-n may represent, for example, each of the flow model circuits 140a-140n and will normally present measurements for the particular flow (e.g., one or more of the links 112a-112n) modeled. Similarly, the link model circuits 144a-144m may perform flow (or congestion) estimation on the particular one of the signals LINK_MEASUREMENTSa-n. The circuit 138 and/or the circuit 142 normally parse the measurements for the particular one of the links 114a-114n being measured. For example, the link model circuit 144a' may be an in memory representation of measurements of the device 140a (e.g., a cell tower). For example, the user devices 102a-102d are all shown connected to device 104a. The data packets may flow over the links 112a-112d, then the link 114a, then the link 116 where the packets are copied to the device 108. Inside the device 108, the packets are normally split up by flow into the links 150a-150n, which are presented as inputs to the flow model circuit 140a-140d. For example, the signal FLOW_MEASUREMENTSa-d are then presented to the inputs 154a-154d of the categorizer circuit 142, which determines that those four flows belonged to the circuit 104a by using the signal LOCATION. Therefore, the measurement signals FLOW_MEASUREMENTSa-d are normally combined by the categorizer circuit 142 into the signal LINK_MEASUREMENTSa which is presented to link model circuit 144a for estimation.

The configuration of the signal MODEL_PARAMETERSa-m may be implemented since there may be a variety of specifications of data for a particular one of the devices 104a-104n to process effectively. Operators may need to provision the system 100 to satisfy flexible user demands, which tend to change over time and may vary. In general, the system 100 may detect problematic operations of a particular one or more of the links 114a-114n (e.g., an operation that differs from the average behavior and becomes suspicious). An average "baseline" behavior may vary between the links 114a-114n. The configuration of the signal MODEL_PARAMETERSa-m accommodates adjustments that may be needed for particular needs of each of the links 114a-114n. For example, the parameters for a tower in an urban area may be in the 40-100 ms latency range, 5-8 Mbps bandwidth range, 0.1-0.9% loss probability range, where the parameters for a rural tower may be 80-200 ms latency range, 6-9 Mbps bandwidth range, 0.5-1.5% loss probability range. Implementing configurability on a per-link basis may eliminate (or at least reduce) the impact of environmental effects and/or limitations. Another example may include different types of network equipment behaving differently (e.g., in one location there may be several towers linked together creating an aggregate link that may need to be analyzed, etc.). A parameter estimator circuit (to be described in more detail in connection with FIG. 3) may automatically optimize the parameters for each of the links 114a-114n to provide an initial estimate baseline.

Figure 3:
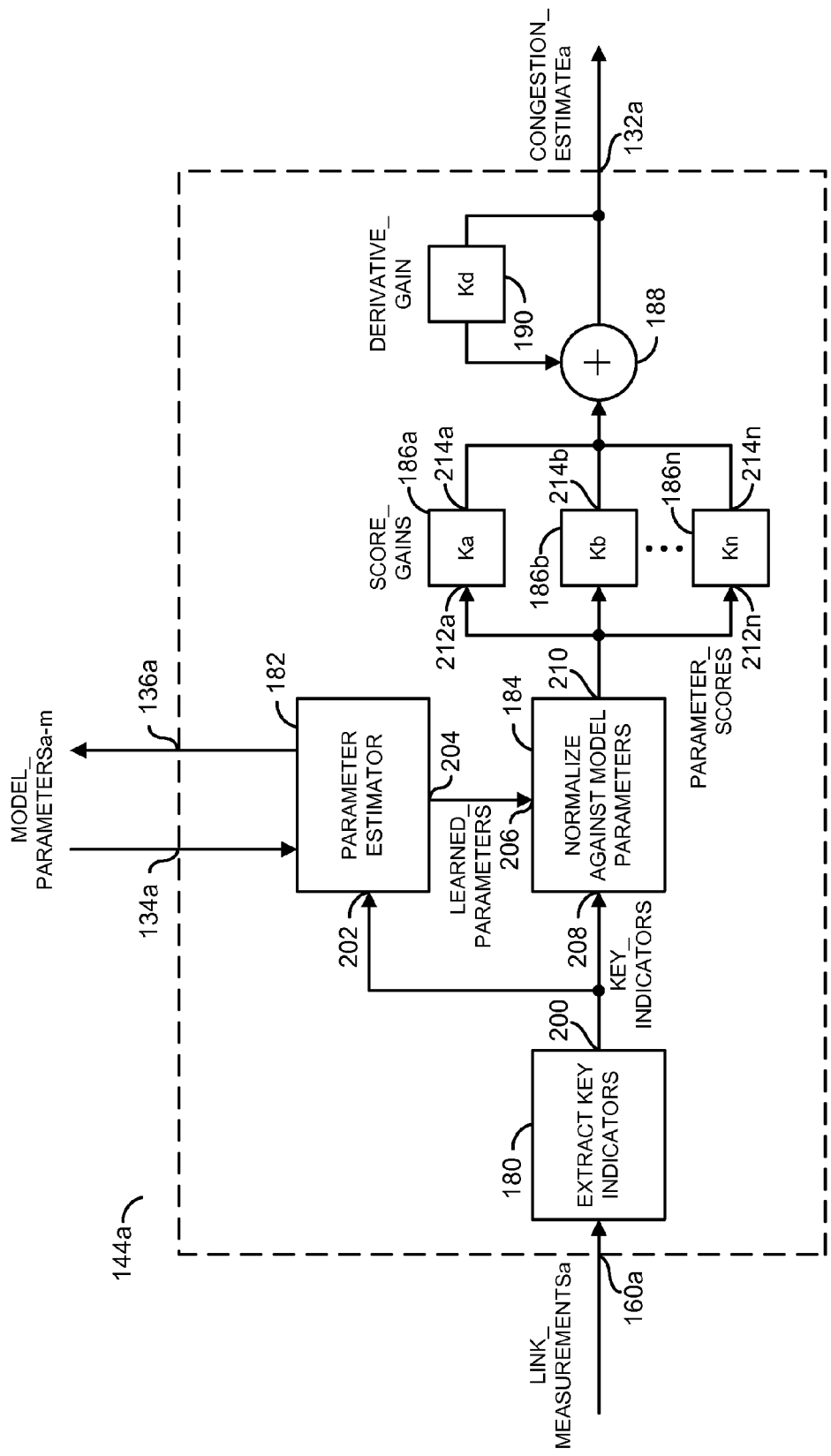
FIG. 3 is a block diagram of a link model overview.

Referring to FIG. 3, a more detailed description of the link model circuit 144a is shown. The link model circuits 144b-144m may each have similar implementations. The circuit 108 generally comprises a block (or circuit) 180, a block (or circuit) 182, a block (or circuit) 184, a plurality of blocks (or circuits) 186a-186n, a block (or circuit) 188 and a block (or circuit) 190. The circuit 180 may be implemented to extract key indicators. The circuit 182 may be implemented as a parameter estimator. The circuit 184 by be implemented to normalize against model parameters. The circuits 186a-186n may each be implemented as score gain circuits. The circuit 188 may be implemented as an adder. The circuit 190 may be implemented as a derivative gain in a feedback loop. The link model circuits 144a-144m may use derived measurements to determine an accurate estimate of the true state of a particular network link 114a-114n. In one example, the link model circuits 144a-144m may determine if a particular one of the devices 104a-104n (e.g., a cell tower) is congested (e.g., if data packets sent from the devices 102a-102n are being ignored).

The circuit 180 may have an input that may receive the signal LINK_MEASUREMENTS. The signal LINK_MEASUREMENTS may comprise independent, time-varying signals that may be synthesized from network flows. The circuit 180 may have an output 200 that may present a signal (e.g., KEY_INDICATORS). The circuit 182 may have an input 202 that may receive the signal KEY_INDICATORS, the input/output 134a/136a that may receive/present the signal MODEL_PARAMETERSa-m and an output 204 that may present a signal (e.g., LEARNED_PARAMETERS). The circuit 184 may have an input 206 that may receive the signal LEARNED_PARAMETERS, an input 208 that may receive the signal KEY_INDICATORS and an output 210 that may present a signal (e.g., PARAMETER_SCORES). The circuits 186a-186n may have respective inputs 212a-212n that may each receive the signal PARAMETER_SCORES and respective outputs 214a-214n that may each present a signal to the adder circuit 188. Each circuit 186a-186n may be configured with a different constant gain K. The adder circuit 188 may have an output that may present the signal CONGESTION_ESTIMATEa. The signals MODEL_PARAMETERSa-m, LEARNED_PARAMETERS and/or PARAMETER_SCORES may be used by the circuits 212a-212n to analyze the LINK_MEASUREMENTS. The circuit 180 may compute a set of key indicators (e.g., KEY_INDICATORS) from the available measurements (e.g., LINK_MEASUREMENT). In one example, the amount of time a data packet takes to be sent to a website (one location) on the Internet 111 and sent back to a user device 102a-102n (and the location) may be analyzed. In one example, the number of data packets that are lost while being transmitted through the system 100 may be analyzed. In another example, the number of packets being transmitted along a particular cell tower 104a-104n may be determined.

The signal MODEL_PARAMETERSa-m may be presented as an output when the parameter estimator circuit 182 records new values to write to persistent storage (not shown). If the monitoring device 108 is powered down, the values loaded for the next run will be the most accurate and/or recent values for the particular model. The signal MODEL_PARAMETERSa-m may be considered an input on startup when the signal MODEL_PARAMETERSa-m is read from storage and an output on shutdown when the signal MODEL_PARAMETERSa-m is recorded for the next run. The signal MODEL_PARAMETERS may be presented to each of the link model circuits 144a-144m.

Referring to FIG. 4, a diagram of a circuit 182 is shown. The circuit 182 generally comprises a block (or circuit) 220, a block (or circuit) 222, a block (or circuit) 224 and a block (or circuit) 226. The circuit 220 may be implemented to initialize a histogram range. The circuit 222 may be implemented to add histogram samples. The circuit 224 may be implemented to record parameters. The circuit 226 may be implemented to determine new parameter values.

The signal KEY_INDICATORS may be presented to the circuit 222. Depending on the particular type of link being modeled, the particular choice of indicators may change. For example, a wired gateway link may use a different set of indicators than an individual radio link 114a-114n. These indicators are generally single numbers that vary over time, derived from the total list of link measurements (e.g., LINK_MEASUREMENT) provided to the link model circuits 144a-144m. The signal LINK_MEASUREMENT may be derived from network measurements such as overall packet counts, TCP packet loss, UDP receiver reports, etc.

For an embodiment of the system 100 implemented in a UMTS network, the link model circuits 144a-144m may receive the signals LINK_MEASUREMENTS for a particular measurement interval and compute the average bandwidth, bandwidth variance, average packet latency and/or average packet loss. The average bandwidth may be averaged across all flows. The bandwidth variance may provide a mean-squared deviation from the average bandwidth computed across all flows. The average packet latency may measure delay between packet arrival and client acknowledgment, which may be averaged across all flows with outliers removed. The average packet loss may measure the percentage of packets detected as lost and categorize by loss type.

The monitoring device 108 may then convert these indicators into "scores" by normalizing the indicators against expected ranges (e.g., the signal LEARNED_PARAMETERS) for each score and clamp the score between zero and one. For each score, the monitoring device 108 may be configured with an acceptable range (e.g., upper and lower limits). A normalized score may be found by subtracting the lower limit and dividing by the difference between the two limits, given by the following formula:

$$\text{Normalized Score} = \overline{y}_i = \frac{(y_i - R_{(i,l)})}{(R_{(i,u)} - R_{(i,l)})} \qquad \text{EQ 1}$$

Where i indexes the variables by indicator, $y_i$ is the particular indicator value, $\overline{y}_i$ is the normalized score, and $R_{(i,l)}$ and $R_{(i,u)}$ are the upper and lower range limits for the indicator, respectively.

Such ranges may be the configurable parameters of the link model circuits 144a-144m, which may be tuned to improve performance of the system. The configurable parameters may also be "learned" by measuring the scores over time and determining a reasonable expected range of values. A generic configuration may be tuned according to field testing. An example configuration is shown in the following TABLE 1:

TABLE 1

| Indicator | Range (Low Score-High Score) |
| --- | --- |
| Average Bandwidth | 5 Mbps-21 Mbps |
| Bandwidth Variance | 10 Mbps-1 Mbps |

TABLE 1-continued

| Indicator | Range (Low Score-High Score) |
|---|---|
| | (inversely correlates to congestion) |
| Average Packet Latency | 100 ms-2 s |
| Average Packet Loss | 0.1% -1% |

The system 100 may develop a final value of the signals CONGESTION_ESTIMATEa-n using a non-linear, multiple-input, single-output measurement model. The model may specify individual score gains, cross-correlation score gains, derivative gain and/or hysteresis.

A final estimate may be calculated by first computing the sum of terms that capture the individual and coupling gains. The estimate of the previous interval may be used to apply a derivative gain. Quantization and hysteresis may be applied to smooth out the final estimate. These steps may be described mathematically by calculating the weighted sum using the following formula:

$$\alpha_{[t+1]} = (a_1\bar{y}_1) + (a_2\bar{y}_2) + (a_3\bar{y}_3) + (b_{1,2}\bar{y}_1\bar{y}_2) + (b_{1,3}\bar{y}_1\bar{y}_3) + (b_{2,3}\bar{y}_2\bar{y}_3) + (c_{1,2,3}\bar{y}_1\bar{y}_2\bar{y}_3) \quad \text{EQ 2}$$

Where:
$\alpha_{[t]}$ = weighted sum for interval t
$y_i$ = normalized score for indicator i
$a_i$ = independent proportional gain corresponding to score i
$b_{i,j}$ = dual-coupled proportional gain for scores i and j
$c_{i,j,k}$ triple-coupled proportional gain for scores i, j, and k The number of coupling terms generally grow quickly with the number of indicators, therefore EQ2 is an example using only three indicators.

The steps may also be described mathematically by calculating the new estimate from the sum and the current estimate using the following formula:

$$\beta_{[t+1]} = \alpha_{[t+1]} K_d (\alpha_{[t+1]} - \beta_{[t]}) \quad \text{EQ 3}$$

Where:
$\beta_{[t]}$ = congestion estimate for interval t
$K_d$ = derivative gain The steps may also be described mathematically by quantizing the new estimate, using the previous quantized estimate and upper and lower thresholds to add hysteresis:

$$\gamma_{[t+1]} = \begin{cases} 1 & \text{if } (\beta_{[t+1]} > \tau_u \ \&\& \ \gamma_{[t]} == 0) \\ 0 & \text{if } (\beta_{[t+1]} \leq \tau_u \ \&\& \ \gamma_{[t]} == 0) \\ 1 & \text{if } (\beta_{[t+1]} > \tau_l \ \&\& \ \gamma_{[t]} == 1) \\ 0 & \text{if } (\beta_{[t+1]} \leq \tau_l \ \&\& \ \gamma_{[t]} == 1) \end{cases} \quad \text{EQ 4}$$

Where:
$\gamma_{[t]}$ = quantized congestion estimate for interval t
$\tau_u$ = upper threshold, for transitioning from low to high
$\tau_l$ = lower threshold, for transitioning from high to low Due to the behavior of congested links 114a-114n, the cross-correlation terms are the most useful. These gains may also be configurable parameters of the system. An example configuration is shown in the following TABLE 2:

TABLE 2

| Score | Gain |
|---|---|
| Normalized Average Bandwidth | 0.1 |
| Normialize Bandwidth Variance | 0.1 |
| Normalized Average Latency | 0.4 |
| Normalized Average Packet Loss | 0.4 |
| Bandwidth Average, Variance Correlation | 1 |

TABLE 2-continued

| Score | Gain |
|---|---|
| Latency, Packet Loss Correlation | 0.5 |
| Bandwidth, Latency, Packet Loss Correlation | 2 |
| Other Correlation Terms | 0 |
| Estimate Derivative | −0.5 |

In a given network, the particular links 114a-114n may show slightly different behavior. Therefore, generic configuration parameters (e.g., indicator ranges) may negatively impact performance. The parameter estimator circuit 182 may be implemented as an optional subsystem of the link model circuits 144a-144m, shown in detail in FIG. 4, that may analyze the input indicators and determine a "good" configuration for the upper and lower range limits.

The parameter estimation process may be implemented as an iterative process that may receive (i) an initial set of parameters to configure the indicator range on startup and (ii) the measured indicator value for each interval.

The parameter estimator circuit 182 may build a running histogram from the measured indicator values. The histogram may be used to infer whether or not the current range is accurately modeling the system. The parameter estimator circuit 182 normally assumes a Gaussian distribution and attempts to tune the indicator ranges such that most regularly occurring values are captured, but extreme outliers are truncated by the upper and lower range limits. The parameter estimator circuit 182 does this by setting the range limits to upper and lower percentiles (e.g., 5% and 95%) of the histogram.

This "parameter update" process may be applied periodically, and may be run slowly, to allow the system to fluctuate normally. In the wireless network embodiment, most wireless networks exhibit daily patterns. Therefor, the parameter estimator would generally perform parameter updates once per day.

As would be apparent to those skilled in the relevant art(s), the signals illustrated in FIGS. 1-4 represent logical data flows. The logical data flows are generally representative of physical data transferred between the respective blocks by, for example, address, data, and control signals and/or busses. The system represented by the circuit 100 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a plurality of flow model circuits each configured to generate a respective flow measurement signal in response to data packets received from a plurality of links on a network;
a categorizer circuit configured to present a plurality of link measurement signals each in response to one or more of said plurality of flow measurement signals; and
a plurality of link model circuits each configured to generate a respective congestion estimation signal in response to (i) a respective one of a plurality of model parameter signals, (ii) a respective one of said plurality of link measurement signals and (iii) a respective one of a plurality of score signals, wherein each of said congestion estimation signals represents a congestion level of a respective one of said links.

2. The apparatus according to claim 1, wherein said apparatus further comprises a parser circuit configured to analyze said data packets to select a corresponding one of said plurality of flow model circuits to process said data packets.

3. The apparatus according to claim 1, wherein each of said plurality of link measurement signals includes a number of timed measurements.

4. The apparatus according to claim 3, wherein said timed measurements comprise one or more of a latency measurement, a bandwidth measurement and a packet loss measurement.

5. The apparatus according to claim 1, wherein each of said plurality of link model circuits (i) normalizes said respective link measurement signal using said respective model parameter signal to generate said respective score signal and (ii) combines a plurality of score values in said respective score signal to generate said respective congestion estimation signal.

6. The apparatus according to claim 1, wherein said links each comprise traffic information and location information of a plurality of user devices and said categorizer circuit is configured to generate said link measurement signals in further response to at least one of said location information and said traffic information.

7. The apparatus according to claim 1, wherein said model parameter signals are configured to be modified by a user to allow customization to at least one of a hardware platform, a network configuration, an environment, and user behaviors.

8. The apparatus according to claim 1 wherein each of said congestion estimation signals represents congestion of a particular link of said network.

9. The apparatus according to claim 1, wherein said categorizer circuit facilitates an estimation of congestion on any logical group of flows which are not necessarily tied to a physical one of said links.

10. A method for providing congestion estimation in a communications system, comprising the steps of:
(A) generating a plurality of flow measurement signals in response to data packets received from a plurality of links on a network;
(B) presenting a plurality of link measurement signals each in response to one or more of said plurality of flow measurement signals; and
(C) generating a respective congestion estimation signal in response to (i) a respective one of a plurality of model parameter signals, (ii) a respective one of a said plurality of link measurement signals and (iii) a respective one of a plurality of score signals, wherein each of said congestion estimation signals represents a congestion level of a respective one of said links.

11. The method according to claim 10, further comprising the steps of normalizing each of said respective link measurement signals using said respective model parameter signals to generate said respective score signals, and combining a plurality of score values in said respective score signals to generate said respective congestion estimation signals.

12. The method according to claim 11, wherein combining said score values comprises the step of calculating a weighted sum value as a sum of (i) a plurality of products of a plurality of proportional gain values and respective ones of said score values, (ii) a plurality of products of a plurality of dual-coupled proportional gain values and respective pairs of said score values, and (iii) a plurality of products of triple-coupled proportional gain value and three of said score values.

13. The method according to claim 12, wherein a current congestion estimation value in said respective congestion estimation signal comprises a sum of said weighted sum value and a product of a constant value and a difference between said weighted sum value and a previous congestion estimation value.

14. The method according to claim 13, further comprising the step of quantizing said current congestion estimation value in response to (i) a plurality of thresholds and (ii) a quantized value of said previous congestion estimation value after said previous congestion estimation value has been quantized.

15. The method according to claim 10, wherein said model parameter signals are configured to be modified by a user to allow customization to at least one of a hardware configuration, a network configuration, an environments, and a user behavior.

16. The method according to claim 10, further comprising the step of estimating congestion on any logical group of flows which are not necessarily tied to a physical one of said links.

17. The method according to claim 10, wherein said respective congestion estimation signal is calculated from a plurality of signals blended together using one or more configurable gains.

18. The method according to claim 10, wherein each flow measurement signal of the plurality of flow measurement signals represents, for a corresponding link of the plurality of links, at least one of: a packet delivered measurement; a packet loss measurement; and a packet latency measurement.

* * * * *